(No Model.) 2 Sheets—Sheet 1.

C. E. WARNER.
TRACTION WHEEL.

No. 363,027. Patented May 17, 1887.

Witnesses

Inventor,
Chas. E. Warner
By his Attorneys,

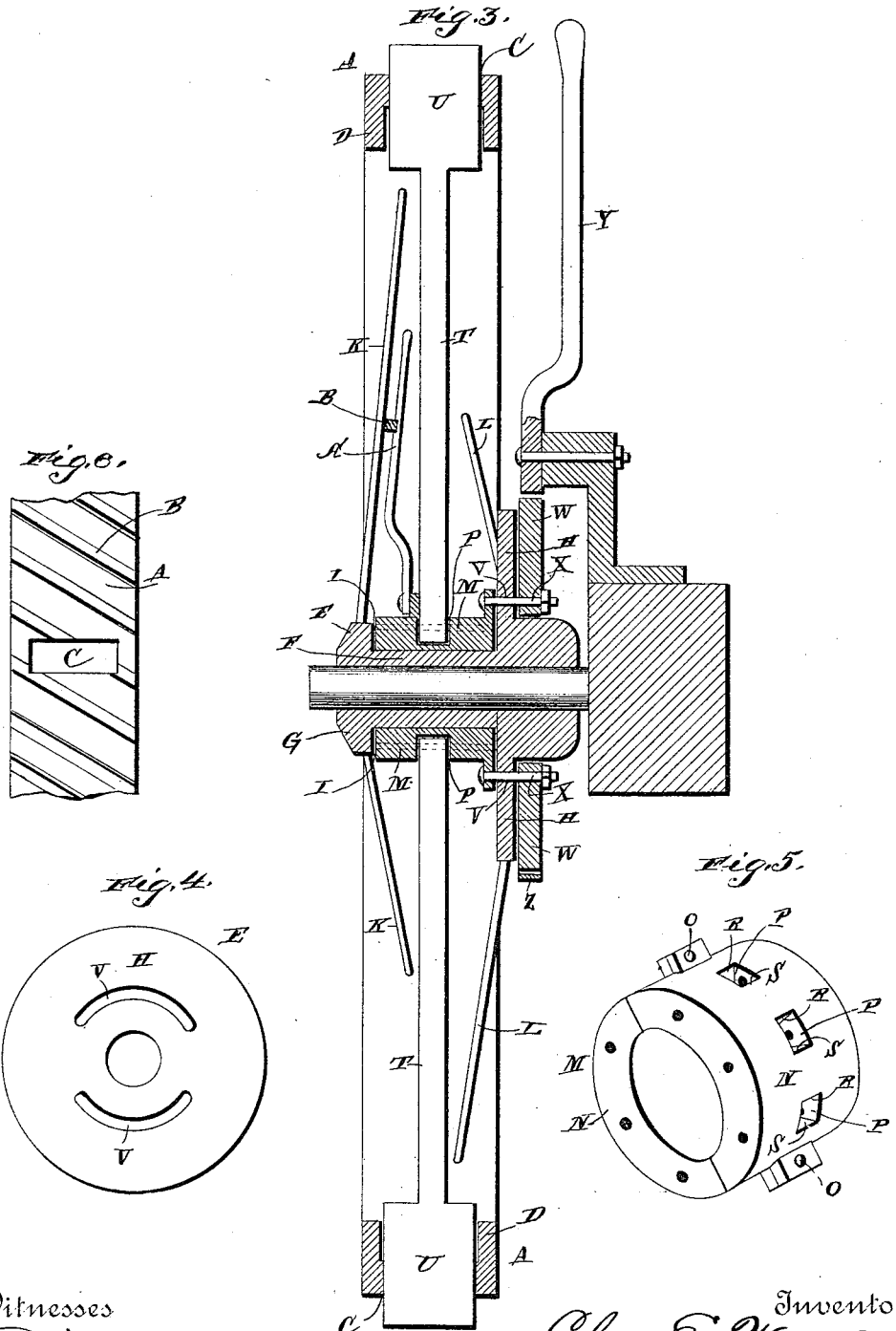

UNITED STATES PATENT OFFICE.

CHARLES E. WARNER, OF MELVERN, KANSAS.

TRACTION-WHEEL.

SPECIFICATION forming part of Letters Patent No. 363,027, dated May 17, 1887.

Application filed March 22, 1887. Serial No. 231,986. (No model.)

*To all whom it may concern:*

Be it known that I, CHARLES E. WARNER, a citizen of the United States, residing at Melvern, in the county of Osage and State of Kansas, have invented a new and useful Improvement in Driving-Wheels for Traction-Engines, of which the following is a specification.

My invention relates to an improvement in driving-wheels for traction-engines; and it consists in the peculiar construction and combination of devices, that will be more fully set forth hereinafter, and particularly pointed out in the claims.

Figure 1:
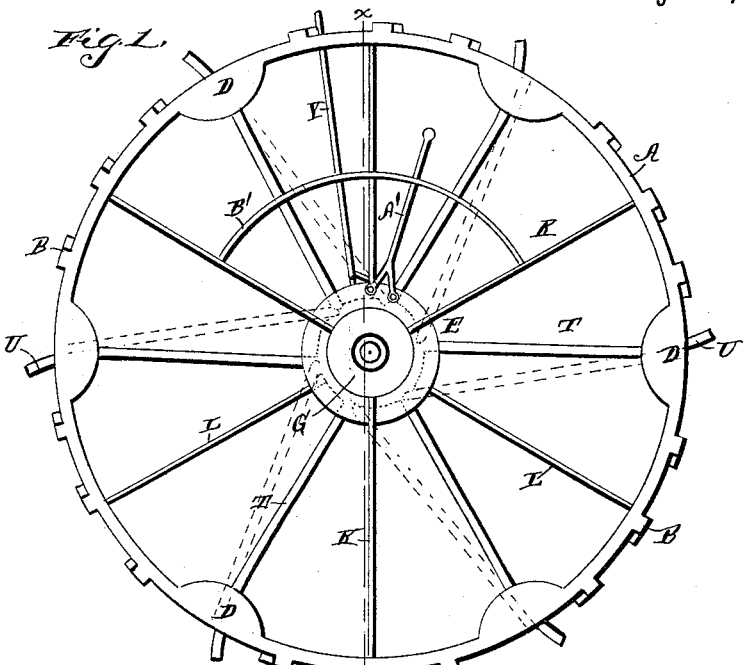
Figure 2:
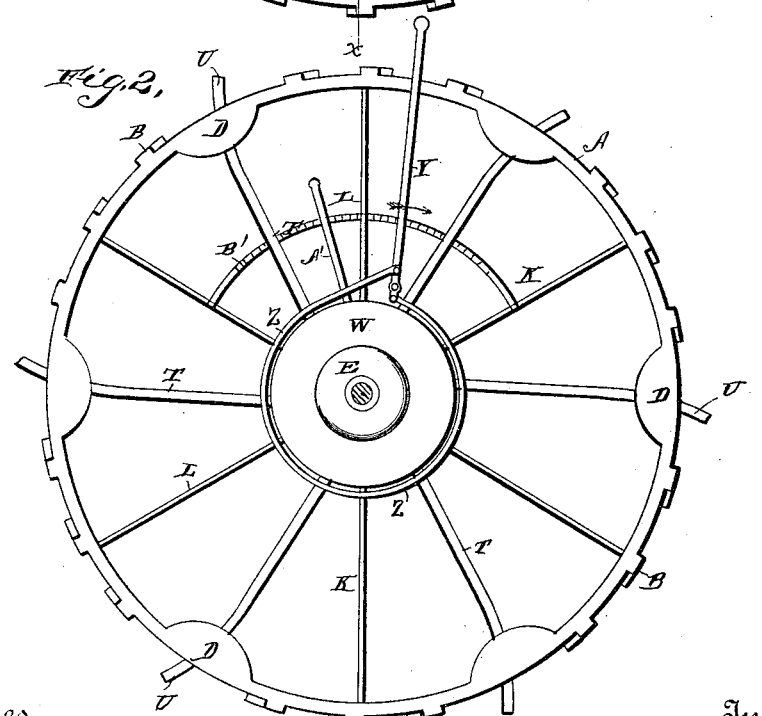

In the drawings, Figure 1 is a side elevation of a traction-wheel embodying my improvements. Fig. 2 is a similar view of the opposite side of the wheel. Fig. 3 is a vertical sectional view of my improved wheel, taken on the line $xx$ of Fig. 1. Fig. 4 is a detailed elevation of one end of the hub with the friction-wheel removed. Fig. 5 is a detailed perspective view of the operating-collar. Fig. 6 is a detailed view of a portion of the periphery of the wheel.

A represents the rim of the wheel, which is preferably made of cast-iron, and may be either formed of a single piece or of separable sections bolted together. The face or outer side of the rim is provided with the usual oblique traction-tongues, B. Through the said rim A, at suitable regular distances apart, are made transverse openings C, which extend about two-thirds of the way across the rim of the wheel. The latter is provided on its inner side with inwardly-curved offsets or stiffening-blocks D, which are formed integrally with the rim and are arranged at the ends of the openings C, and thereby strengthen the rim of the wheel at the points thereof which are weakened by the openings C.

E represents the hub of the wheel, and comprises the cylindrical tubular portion F, the annular projecting head G, formed at the front end of the tubular portion F and integral therewith, and the annular disk portion H, formed at the inner end of the tubular portion F, and also made integral therewith. This leaves an annular groove, I, surrounding the portion F and between the head G and the disk H. K represents an outer series of spokes, which connect the head G to the rim, and L represents an inner series of similar spokes, which connect the annular disk H with the rim. The said series of spokes K and L are arranged out of line with each other, each spoke K being arranged midway between two of the spokes L, and thus serving to more effectually brace the wheel.

M represents an annular collar, which is preferably made of cast or wrought metal, and is formed of two semi-cylindrical sections, N, secured together by means of bolts O. The said sections of the collar are bolted together on the tubular portion F of the hub, the said collar fitting loosely on the hub and being adapted to rotate thereon. The collar M is provided with a series of radial openings, P, the front sides, R, of which are arranged at a slight angle with relation to an imaginary line passing through the center of the collar. The rear sides, S, of the said openings are arranged at an angle of about seventy-five degrees with relation to the front sides, R. Both the front and rear sides are thereby tangential and not radial.

T represents a series of arms which have their inner ends pivoted in the openings P of the collar, and the outer ends of the said arms are broadened and flattened to form transverse heads or lugs U, which enter and are adapted to extend through the openings C in the rim of the wheel. The said lugs or heads are curved slightly in the direction in which the wheel rotates when the engine to which it is attached is advancing.

From the foregoing description it will be readily understood that when the collar is turned on the hub in one direction it causes the lugs or heads U of the arms to be withdrawn in the openings C, so that the outer ends of the said lugs or heads will be flush with the periphery of the wheel. This position is illustrated in dotted lines in Fig. 1, and when thus arranged the inner ends of the arms T bear against the sides S of the openings P. When the collar is turned in the contrary direction on the hub, the arms T are extended, so as to project their heads or lugs U through the openings C and cause them to extend beyond the periphery of the wheel, as shown in solid lines in Fig. 1. When in this position, the inner ends of the arms T bear against the tangential sides R of the openings in the collar.

The hub-disk H is provided on opposite sides of its central opening with a pair of concentric slots, V.

W represents a friction-wheel, which has a central opening large enough to clear the projecting head on the outer side of the disk H, and from the front side of the said friction-wheel project bolts or studs X, which pass through the slots V and enter the rear side of the collar, thereby rigidly connecting the friction-wheel to the collar and causing the said friction-wheel and collar to rotate together when either of them is turned.

Y represents a hand-lever, which is fulcrumed to a fixed point on the body or bed of the engine or machine, and Z represents a friction-band, which encircles the friction-wheel W and fits in a peripheral groove with which the said friction-wheel is provided. One end of this band is attached to the hand-lever Y at a slight distance beyond one side of the fulcrum thereof, and the other end of the band is attached to the said hand-lever at a suitable distance from the opposite side of the fulcrum, and thereby, when the lever is turned in the direction indicated by the arrow in Fig. 2, it will be readily understood that the band Z will be tightened upon the periphery of the friction-wheel, so as to clamp the latter, and thereby prevent it and the collar from rotating with the wheel. When the rotation of the collar is arrested, the continued rotation of the traction-wheel as the machine progresses causes the arms T to move from the position indicated by dotted lines in Fig. 1 to the position indicated by solid lines in the said figure, and thereby project the heads or lugs U beyond the periphery of the wheel, and thus enable the said lugs to take a firm hold in soft or muddy ground, and thereby insure sufficient frictional contact of the wheel with the ground to cause the engine to be urged forward when the wheel is rotated.

A' represents a hand-lever, which is attached to the collar and projects from one side thereof. This hand-lever is adapted to engage the teeth of a segmental rack-bar, B', which is secured to the inner sides of some of the spokes K and is arranged concentrically in the traction-wheel.

When the rotation of the collar is arrested and the wheel continues to turn, as before described, so as to project the lugs or heads U from the periphery thereof, the lever A' sweeps rearward against the inner side of the rack-bar B' and locks the collar to the wheel, and thereby serves to hold the arms P in any desired position and with their heads or lugs U projected any desired distance beyond the periphery of the wheel.

Having thus described my invention, I claim—

1. The combination of the wheel having the openings C in its rim, and the solid blocks or offsets D on the inner side of the rim and integral therewith at the ends of the said openings, with the collar loose on the hub and adapted to turn thereon, and the arms T, pivoted to the said collar and having the heads or lugs U at their outer ends engaging the openings C, for the purpose set forth, substantially as described.

2. The combination of the wheel having the openings C in its rim, and the solid hub having the annular groove I, with the collar O, made in separable sections, bolted together, and fitted loosely on the hub in the groove I, and the arms T, having their inner ends pivoted to the collar and their outer ends flattened to form heads or lugs U in the openings C, for the purpose set forth, substantially as described.

3. The combination of the wheel having the peripheral openings C with the collar adapted to rotate on the hub of the wheel, the friction-wheel, secured to the collar and movable therewith, the arms T, having their inner ends pivoted to the collar and their outer ends forming heads or lugs U in the openings C, and the lever Y, adapted to engage the friction-wheel, and thereby arrest the rotation of the collar, when the wheel is turning, for the purpose set forth, substantially as described.

4. The combination of the wheel, the collar adapted to rotate on the hub, the arms T, having their inner ends pivoted to the collar and their outer ends guided in the rim of the wheel, and the lever Y, to arrest the rotation of the collar, for the purpose set forth, substantially as described.

5. The combination of the wheel having the peripheral openings C with the collar adapted to turn on the hub of the wheel, the arms T, pivoted to the collar and having their outer ends engaging the openings C, the lever or detent A', to lock the collar to the wheel, and the lever Y, to momentarily arrest the rotation of the collar while the wheel is turning, substantially as described.

In testimony that I claim the foregoing as my own I have hereto affixed my signature in presence of two witnesses.

CHARLES E. WARNER.

Witnesses:
 GEORGE S. FRANCIS,
 WILLIAM B. WILLIAMS.